(12) United States Patent
Rey et al.

(10) Patent No.: US 9,919,434 B1
(45) Date of Patent: Mar. 20, 2018

(54) ARTICULATED ARM

(71) Applicant: COMMISSARIAT A L'ENERGIE ATOMIQUE ET AUX ENERGIES ALTERNATIVES, Paris (FR)

(72) Inventors: Frédéric Rey, Pierrevert (FR); Slim Alouani, Aix en Provence (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 426 days.

(21) Appl. No.: 14/442,918

(22) PCT Filed: Nov. 12, 2013

(86) PCT No.: PCT/EP2013/073619
§ 371 (c)(1),
(2) Date: May 14, 2015

(87) PCT Pub. No.: WO2014/076080
PCT Pub. Date: May 22, 2014

(30) Foreign Application Priority Data

Nov. 14, 2012 (FR) ..................... 12 60852

(51) Int. Cl.
*B25J 18/06* (2006.01)
*B25J 17/02* (2006.01)
*B25J 9/00* (2006.01)

(52) U.S. Cl.
CPC ............ *B25J 18/06* (2013.01); *B25J 9/0075* (2013.01); *B25J 17/0266* (2013.01); *Y10S 901/15* (2013.01)

(58) Field of Classification Search
CPC ....... B25J 18/05; B25J 9/0075; B25J 17/0266
See application file for complete search history.

(56) References Cited

U.S. PATENT DOCUMENTS 3,497,083 A * 2/1970 Anderson .................. B25J 9/06
138/120
4,369,814 A * 1/1983 Humphrey .............. B63C 11/10
138/120

(Continued)

FOREIGN PATENT DOCUMENTS

CN 102729240 10/2012
FR 2565882 12/1985

(Continued)

OTHER PUBLICATIONS

Chinese Office Action dated May 24, 2016 issued in counterpart application No. 201380070388.6, 9 pages.

(Continued)

*Primary Examiner* — David M Fenstermacher
(74) *Attorney, Agent, or Firm* — The Farrell Law Firm, P.C.

(57) ABSTRACT

The present invention relates to an articulated arm (100) comprising at least three articulations mounted in series in order to allow movements on at least two rotation axes by articulation, characterized in that each articulation (1) comprises a first (2) and second (3) support and at least three linear actuators (10), each linear actuator (10) having a first and second end articulated respectively on the first (2) and second (3) supports by means of a swivel connection (41, 42, 43, 44) and in that it comprises a deformable fluidtight sheath (200) enveloping at least a plurality of articulations and having a volume enabling it, in any circumstance, to follow the movements imparted by the articulated arm.

25 Claims, 10 Drawing Sheets

(56) References Cited

U.S. PATENT DOCUMENTS

| | | | | |
|---|---|---|---|---|
| 4,393,728 | A | * | 7/1983 | Larson ................ B05B 15/061 |
| | | | | 248/160 |
| 4,621,965 | A | * | 11/1986 | Wilcock ................ B25J 18/06 |
| | | | | 414/7 |
| 4,712,969 | A | * | 12/1987 | Kimura ................ B25J 9/06 |
| | | | | 148/402 |
| 4,751,821 | A | * | 6/1988 | Birchard ................ A61F 2/58 |
| | | | | 60/527 |
| 4,848,179 | A | | 7/1989 | Ubhayakar |
| 4,977,790 | A | * | 12/1990 | Nishi ................ B25J 18/06 |
| | | | | 74/490.04 |
| 5,129,279 | A | * | 7/1992 | Rennex ................ B25J 17/0216 |
| | | | | 414/735 |
| 7,209,344 | B2 | * | 4/2007 | Hillman ................ F16M 11/08 |
| | | | | 248/917 |
| 8,571,711 | B2 | * | 10/2013 | Jacobsen ................ B08B 9/045 |
| | | | | 180/9.21 |
| 8,863,608 | B2 | * | 10/2014 | Fischer ................ B25J 9/142 |
| | | | | 74/490.04 |
| 9,113,663 | B2 | * | 8/2015 | Stern ................ B25J 9/065 |
| 9,624,911 | B1 | * | 4/2017 | Griffith ................ F03G 6/02 |
| 9,713,873 | B2 | * | 7/2017 | Cheng ................ A61B 1/00078 |
| 9,751,216 | B2 | * | 9/2017 | Kim ................ B25J 5/007 |
| 2009/0314119 | A1 | | 12/2009 | Knoll |
| 2012/0048156 | A1 | | 3/2012 | Zhang et al. |

FOREIGN PATENT DOCUMENTS

| | | |
|---|---|---|
| GB | 2 144 711 | 3/1985 |
| JP | 58-196092 | 12/1983 |
| JP | 60-56893 | 4/1985 |
| JP | 61-65796 | 4/1986 |
| JP | 01-092093 | 4/1989 |
| JP | 03-043184 | 2/1991 |
| JP | 06-114785 | 4/1994 |
| JP | 2003-172418 | 6/2003 |
| JP | 2010-505637 | 2/2010 |

OTHER PUBLICATIONS

PCT/ISA/237 Written Opinion issued on PCT/EP2013/073619, pp. 6.

PCT/IPEA/409 Preliminary Report on Patentability, pp. 6.

Japanese Notification of Reasons for Refusal dated Aug. 22, 2017 issued in counterpart application No. 2015-542245, 7 pages.

* cited by examiner

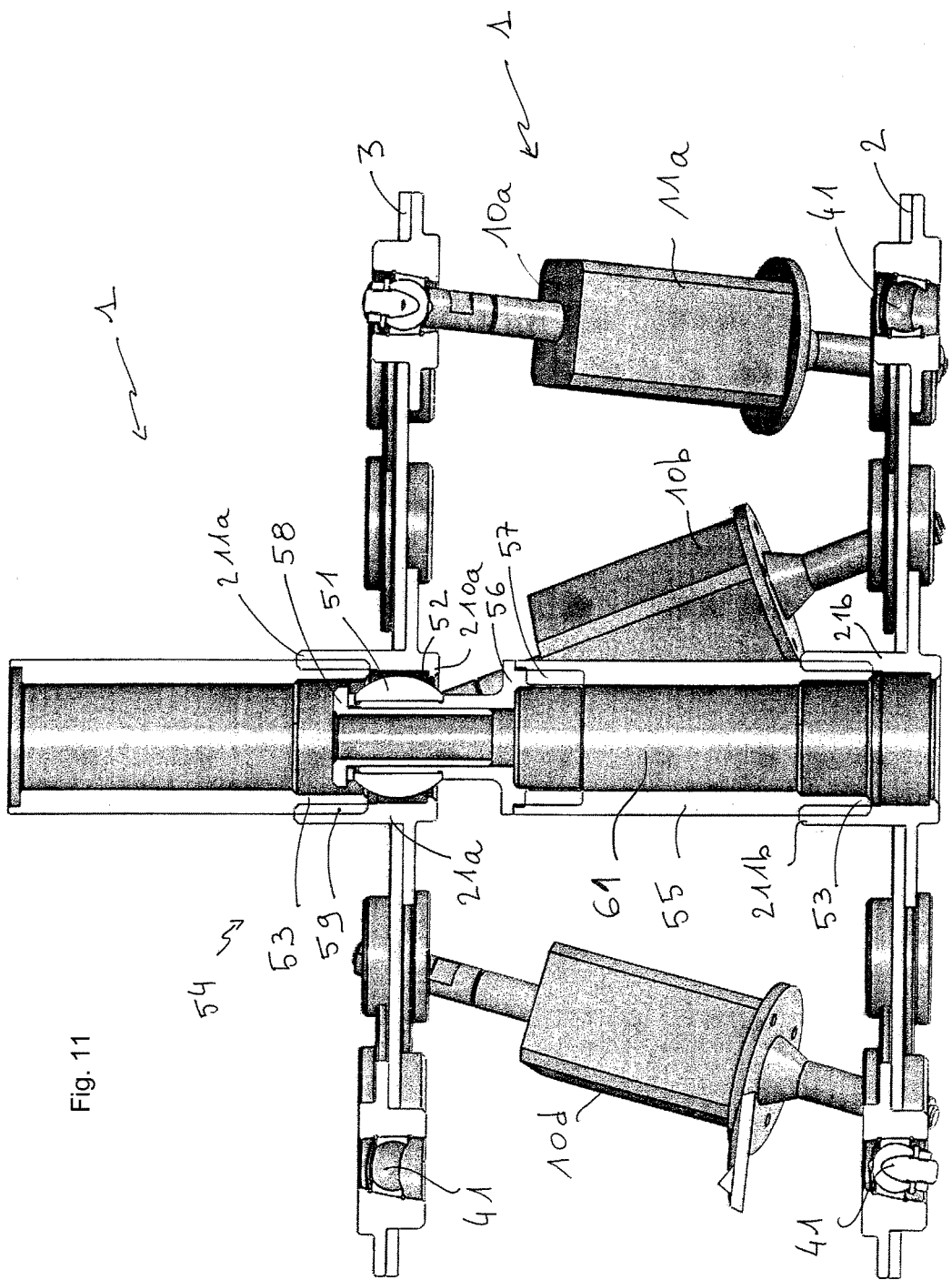

ARTICULATED ARM

PRIORITY

This application is a U.S. National Phase application of International Application No. PCT/EP2013/073619 filed Nov. 12, 2013, claiming priority to Application No. 12 60852 filed with the French Intellectual Property Office on Nov. 14, 2012, the content of each of which is incorporated herein by reference.

TECHNICAL FIELD OF THE INVENTION

The invention concerns the field of robotics and more particularly that of that polyarticulated arms. The non-limitative but particularly advantageous application thereof is the field of the inspection and repair of nuclear reactors.

PRIOR ART

In certain fields such as the nuclear field for example, the use of ever more precise and robust robots is more and more important. This is because, in an increasing desire to improve the safety of nuclear reactors, recourse to robots appears to be particularly attractive for carrying out inspection and/or repair tasks whilst the reactor is in service (these tasks are usually referred to as ISIR, standing for "In Service Inspection and Repair". These robots can also work on installation-dismantling sites (mainly nuclear dismantling) and also during nuclear accidents and more generally industrial accidents making it impossible to access zones where it is necessary to work except by causing a high risk for human operators.

Typically, these robots must be capable of incorporating sensors, and tools for measuring and repairing in a nuclear unit.

The robots currently used are generally mounted on a pole manipulated from the outside of the main vessel of the reactor. The main accesses to the inside of this vessel are situated on the floor. Inspection or repair mechanisms can be introduced through these accesses. These solutions are satisfactory overall when the zones to be inspected are easy to access. There had never up to the present time been a requirement to access the deepest immersed parts of this type of reactor. Because of changes in regulations, the Nuclear Safety Authority now requires that it be possible to inspect all or part of these zones. The means employed up until now do not allow this.

The increasing requirements in terms of safety therefore require that, during ISIR tasks, the robots must access zones that are difficult to access in the reactor unit. Furthermore, these zones that are difficult to access may sometimes be situated at a relatively great distance from the point where the robot enters the reactor.

The known solutions involving poles do not make it possible to position the robot in zones that are difficult to access and are therefore not suited to the stringent requirements in terms of ISIR. Furthermore, these solutions present problems in terms of decontamination because of their difficulty in cleaning. The inspection and repair tools are introduced into the main vessel of the reactor during specific operations. These tools do not remain in the vessel outside these periods and are therefore absent during phases of operation of the reactor. It is therefore necessary to bring out and move the mechanised ISIR means. Provision is also made for carrying out inspection and services and/or maintenance of this equipment. For these reasons, it is necessary to limit the contamination they may bring with them when they are brought out of the reactor. Likewise they must be washable as easily as possible with the highest possible level of cleanliness. For these reasons, it is essential to limit the areas where coolant is retained on these tools.

The robots are introduced into the main vessel of the reactor via an access at the reactor floor. They are positioned by means of a mechanism that is referred to as a "positioner" and which comprises one degree of freedom in rotation (inherent rotation) and one degree of freedom in translation in order to provide descent into the vessel. The positioner is fixed to the floor. The robot is fixed to the other end of the positioner.

Moreover, some reactors impose a particularly constraining environment on the robots. Such is the case with reactors with $4^{th}$-generation coolants. In this type of reactor, the coolant is general sodium. This metal is chemically very reactive. The robot and its articulations must keep their integrity in contact with this coolant fluid.

However, the robots comprise electrical components, sensors and motors for example, which cannot be disposed in contact with coolant fluid such as sodium. Furthermore, the temperature of the coolant remains relatively high in order to keep the latter in the liquid state, which represents an additional constraint. The ASTRID (Advanced Sodium Technological Reactor for Industrial Demonstration) reactor constitutes an example of this type of reactor.

In the context of the development of the present invention, it has been found that the robotic arms used for example in industry on assembly lines have drawbacks when they are subjected to the constraints mentioned above.

For example, in the industrial field, recourse is often had to robotic arms formed by a succession of pivots working in shearing at the junctions of their articulations and having perpendicular rotation axes. Such an arm is illustrated in FIG. 1. In order to preserve the integrity of the robot in the presence of fluid such as sodium, it has been envisaged, in the context of the present invention, isolating the articulations from the coolant fluid and enveloping them in a sheath. It then turned out that the sheath tears relatively quickly.

In the context of the present invention, it was then envisaged forming a seal at the articulations by providing very narrow openings provided with a gasket at the surfaces situated opposite during shearing. This solution also may have limits in terms of reliability of fluidtightness and strength over time.

Another solution was envisaged and makes provision for replacing the gaskets with a gas overpressure inside the articulation with bubbling from the inside towards the outside of the articulation. This solution has the drawback of being complex and not sufficiently reliable.

In the context of the development of the present invention, it was also envisaged having recourse to an arm formed by a succession of segments articulated on one another by connections of the finger swivel type. With this type of connection, the articulation carries the centre of rotation about which these rotations are made and it is possible to make rotations on two axes perpendicular to each other.

The load capacity of this type of articulation is relatively limited.

Furthermore, this articulation has the drawbacks mentioned above concerning the isolation of the articulations with respect to a fluid in which the robotic arm is immersed. In particular, it has been found that a sheath placed around the arm quickly tears.

There therefore exists a need consisting of proposing a mechanised arm having at least two degrees of rotational freedom and having improved fluidtightness with respect to a fluid in which it would be introduced. The object of the present invention is to propose a solution that meets this requirement.

The other objects, features and advantages of the present invention will emerge from an examination of the following description and the accompanying drawings. Naturally other advantages can be incorporated.

SUMMARY OF THE INVENTION

To achieve this objective, one aspect of the present invention concerns an articulated arm comprising at least three articulations mounted in series in order to allow movements of the arm on at least two rotation axes, each articulation comprising a first and second support as well as at least one and preferably at least three expandable and retractable linear actuators, each linear actuator having first and second ends articulated respectively on the first and second support by a swivel connection. The invention thus proposes a polyarticulated arm with improved robustness and load capacity and with an ability to move in at least two degrees of rotational freedom by articulation.

According to an advantageous embodiment, the articulated arm comprises a fluidtight deformable sheath enveloping at least a plurality of articulations.

The following documents describe articulated arms for specific applications and not intended for the nuclear medium or for extreme media: U.S. Pat. No. 4,848,179, US2009/0314119. It has been found that these solutions also have the disadvantage of not resisting high loads. They are therefore confined to limited applications.

Thus the invention proposes a robotic arm having at least two degrees of rotational freedom by articulation on two axes perpendicular to the principal direction along which the arm extends. It has turned out that the fluidtight sheath has a resistance to wear and a service life much superior to the sheaths enveloping the robotic arms of the known solutions described in the section relating to the prior art.

In the context of the development of the present invention, it has been observed that, in the known solutions, the centres of the rotations are situated inside the sheath, which gives rise to very small radii of curvature and therefore concentrates the stresses on small areas of the sheath. As rotations are generated by the articulations, the fatigue on these areas increases very rapidly and ruptures appear. With the robotic arm according to the invention, the centres of rotation of each articulation are pushed to the outside of the sheath or at least outside the articulation.

The stresses applied to the sheath are therefore distributed more evenly along its length. The areas of high fatigue are then limited or even eliminated. The fatigue strength and the service life of the sheath are then improved.

The invention thus offers a reliable, robust and simple solution for improving the protection of the articulations with respect to the surrounding environment in which they move.

Furthermore, this solution has the advantage of preventing contact of the sodium with the mechanism of the robotic arm. This considerably limits the possible areas of retention of sodium and reduces the difficulty relating to cleaning and decontamination of the robotic arm. This is particularly useful when the arm has finished its work in the vessel and has emerged therefrom. It must then be cleaned or even serviced and maintained, and this is facilitated by the limited presence of sodium.

The invention affords a particularly effective solution for forming polyarticulated arms intended for ISIR tasks in nuclear reactors. It is particularly advantageous in 4th-generation sodium coolant reactors.

According to an advantageous embodiment, the sheath is preferably conformed so as to be held at a distance from the linear actuators and swivel connections whatever the movement of the articulated arm. Thus, even when an external pressure is applied to the sheath, for example a pressure at one point applied to the external envelope of the sheath or for example a pressure from the external environment to the sheath, the latter is kept at a distance from the actuators of the articulations. There is therefore no contact between the sheath and the swivels coupling the linear actuators to the supports or between the sheath and a jack or its rod forming the actuator.

According to an advantageous embodiment, the sheath preferably has a volume that cannot be modified substantially by the effect of an external pressure, such as for example the pressure related to immersion in a liquid or by pressure at one point. Thus, even if the arm is immersed in a liquid or is disposed in a pressurised fluid, the sheath keeps a volume that is fixed by geometric considerations and is not influenced by the pressure. Preferably, the volume of the sheath is constant.

Advantageously, this prevents the sheath, under the effect of pressure, coming into contact with the articulations, which could tear it or damage the linear actuators.

Furthermore, and also advantageously, this makes it possible to increase the Archimede buoyancy exerted on the arm, with respect to a solution based on a compressible sheath. The Archimede buoyancy is opposed to the weight of the arm. The latter can therefore have a higher mass, for example by being more elongate than an arm with a deformable sheath or than an arm without a sheath, without having to provide a structure or mechanical reinforcement for compensating for this increase in mass. The maneuverability and/or the external load capacity of the arm are therefore significantly improved.

BRIEF DESCRIPTION OF THE FIGURES

The aims, objects, features and advantages of the invention will emerge more clearly from the detailed description of an embodiment thereof that is illustrated by the following accompanying drawings, in which:

FIG. 11 illustrates an embodiment in which the force-absorbing structure is hollow.

Figure 1:
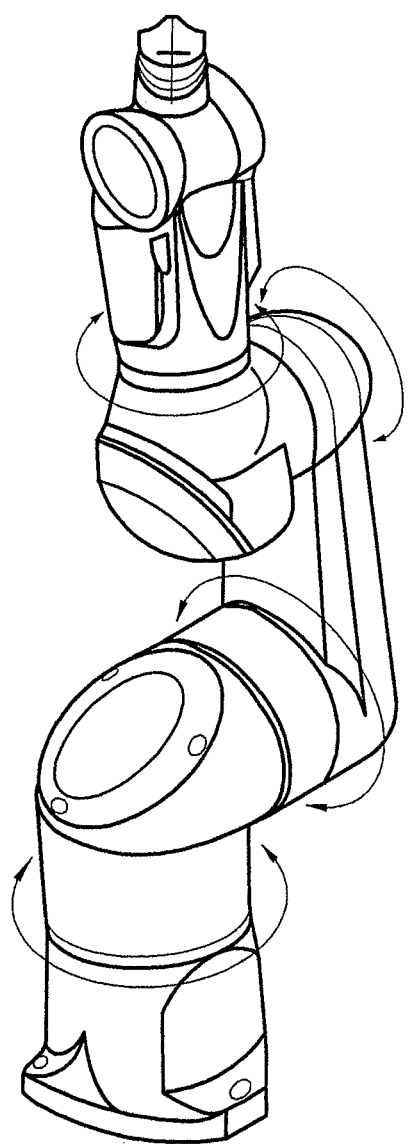
FIG. 1 illustrates an example of a polyarticulated arm according to the prior art.

The drawings are given by way of examples and are not limitative of the invention. They constitute schematic outline representations intended to facilitate understanding of the invention and are not necessarily to the scale of practical applications. In particular the relative dimensions of the various elements do not represent reality.

DETAILED DESCRIPTION OF THE INVENTION

Before beginning a detailed review of embodiments of the invention, optional features which may optionally be used in association or alternatively are stated below:

Preferably, the sheath envelopes all the articulations, optionally with the exception of the articulations of the ends of the articulated arm.

Advantageously, the volume of the sheath remains constant or does not vary by more than 10% or preferably does not vary by more than 5% when it is subjected to a pressure of less than or equal to 10 bar, preferably less than or equal to 5 bar.

Preferably, the sheath is a corrugated tube, also referred to as a bellows tube.

Preferably, the sheath is produced from a material taken from among the grades of stainless steel, titanium, carbon, copper, polymers including silicone, or a combination of these materials.

According to an advantageous embodiment, the first and second supports are conformed so as to keep the sheath at a distance from at least one linear actuator.

According to one advantageous embodiment, the arm comprises a support structure configured so as to hold the sheath at a distance from at least one linear actuator. According to another advantageous embodiment, the sheath is held at a distance from at least one linear actuator by the pressure prevailing inside the sheath. The articulated arm comprises a gas enclosed inside the sheath. Thus the articulated arm comprises a gas enclosed inside the sheath.

According to an advantageous embodiment, the arm is configured so as to hold the sheath at a distance from the linear actuators and the supports, that is to say also from the articulations.

According to an advantageous embodiment, the sheath comprises, in addition to the articulations, a fluid. Preferably, the fluid is lighter than the fluid in which the arm is intended to move. For example, the fluid inside the sheath is a gas, such as air, and the arm is immersed in a liquid, such as water or sodium. The gas is enclosed in the sheath. It cannot therefore escape therefrom.

Preferably, the sheath is in a single piece. Alternatively, the sheath comprises a fluidtight envelope supported by a support structure.

Without this being limitative of the invention, the supports are made from a material taken from: steel, stainless steel, titanium, composite materials including those composed of carbon or glass, or a combination of these materials.

Preferably, each articulation has length and width such that the length to width ratio is between 0.5 and 1, the length being taken in the longitudinal direction of the arm and the width being taken in a direction transverse to the longitudinal direction. The longitudinal direction is the direction in which the arm has the largest dimension when it is rectilinear. The longitudinal direction is the direction in which the arm extends when it is rectilinear. This direction is denoted Rz. This ratio improves the dexterity of the articulated arm.

Advantageously, the arm comprises at least eight articulations.

Preferably the linear actuators and the absorbing structure provide by themselves alone the mechanical articulation between the first and second supports. There are therefore no other elements provided for moving or retaining the two supports with respect each other.

Advantageously, at least one of the articulations comprises six linear actuators so as to form a hexapod articulation. The six linear actuators are advantageously disposed so as to eliminate any rubbing or jamming position.

According to an advantageous embodiment, at least one articulation and preferably all the articulations comprise: a force-absorbing structure that is on one hand embedded on the first support and on another hand coupled to the second support by a swivel connection. This structure absorbs shearing forces and dedicates the force of the actuator or actuators to the rotation movements. Each articulation can thus have reduced size and weight. Because of this the whole of the structure has reduced weight. It may therefore have a greater length and/or a greater number of articulations, thereby improving the accessibility and dexterity of the articulated arm.

Advantageously, two articulations in series comprise a common support. The number of parts and the weight of the structure are thus reduced. Advantageously, all the supports, with the exception with those of the ends of the articulated arm, are common to two articulations.

Preferably, the centre of rotation of the swivel connection coupling the force-absorbing structure to the second support is situated in the thickness of the second support.

Advantageously, the centre of rotation of the swivel connection articulating the force-absorbing structure on the second support is situated between two planes intersecting the second support, said two planes being parallel to each other and parallel to a plane defined by two rotation axes Rx, Ry perpendicular to each other and about which the second support is rotated with respect to the first support while keeping the first support fixed. The axis Rz is the axis of any inherent rotation of the second support, that is to say the rotation of the second support on itself. The force-absorbing structure extends in a principal direction. Typically, the direction Rz is the principal direction in which the force-absorbing structure. The direction Rz is defined by the straight line passing through the embedding connection and the centre of rotation of the swivel connection coupling the force-absorbing structure on the second support. This direction is therefore fixed whatever the deployment of the linear actuators.

Advantageously, the centres of the swivel connections by means of which the linear actuators are articulated on the first support are coplanar. The plane defined by the centre of the swivel connections by means of which the linear actuators are articulated on the first support is parallel to two planes, parallel to each other, passing through the second support and between which the centre of rotation of the swivel connection coupling the force-absorbing structure on the second support is situated.

The contour of the second support defines an external envelope and said centre of rotation of the swivel connection formed by the second support and the force-absorbing structure is situated inside this envelope.

The centre of rotation of the swivel connection is ideally located in the mid-plane of the second support.

Preferably, the second support has an internal face turned towards the force-absorbing structure and an external face opposite to the internal face and in which the centre of rotation is situated between the internal and external faces, ideally in a plane median to these two faces.

Preferably, the centre of rotation of the swivel connection coupling the force-absorbing structure of the second support is situated at equal distances from the external face and the internal face of the second support, that is to say at the middle of the thickness of the second support.

According to a non-limitative embodiment, the internal face and the external face are planar.

According to a non-limitative embodiment, the force-absorbing structure is a connecting arm, a first end of which is embedded on the first support and the second end of which is coupled to the second support by a swivel connection. Preferably, the force-absorbing structure is a tube.

According to one embodiment, the invention provides an articulation based on an articulation of the Stewart platform type and integrating other features such as a structure for absorbing shearing forces.

The linear actuators are retractable arms. The linear actuators are for example hydraulic jacks, pneumatic jacks or screw jacks, etc.

The linear actuators do not comprise a pivot or swivel connection other than the swivel connection allowing coupling thereof to the first and second supports. A linear actuator, taken in isolation, is therefore able to move solely in translation and optionally in rotation about its translation axis.

The first support is rigid. It does not comprise any articulation other than those with external elements to which it is connected (actuators, force-absorbing structure for example). Likewise, the second support is rigid. It does not comprise any articulation other than the one with external elements to which it is connected.

Advantageously, said centre of rotation of the swivel connection formed by the second support and the force-absorbing structure is situated at the centre of its circle formed by the swivel connections by means of which the linear actuators are articulated on the second support.

Advantageously, the force-absorbing structure is embedded on the first support at the centre of a circle formed by the swivel connections by means of which the linear actuators are articulated on the first support.

Advantageously, the swivel connections by means of which the linear actuators are articulated on the first support each have a centre of rotation that is situated in the thickness of the first support. Thus the centre of rotation of the swivel connections coupling the actuators to the first support is situated between two planes passing through the first support, said two planes being parallel to each other and parallel to a plane defined by two rotation axes Rx, Ry perpendicular to each other and about which the second support is rotated with respect to the first support while keeping the first support fixed. Preferably, the centre of rotation of the swivel connections coupling the actuators to the first support is situated between two planes passing through the first support, said two planes being parallel to each other and perpendicular to the axis Rz passing on one hand through the embedding connection between the force-absorbing structure and the first support and passing on another hand through the centre of the swivel connection coupling the force-absorbing structure to the second support. Advantageously, the lever arm between the swivel connection and the first swivel connections and the first support is reduced, thereby limiting the forces generated on the first support and the swivels.

Advantageously, the swivel connections by means of which the linear actuators are articulated on the second support have a centre of rotation that is situated in the thickness of the second support. Advantageously, the lever arm between the swivel connections and second support is reduced, thereby limiting the forces generated on the second support and the swivels.

According to a non-limitative embodiment, at least one from among the first and second supports forms a plate. Thus the centre of rotation of the swivel coupling the force-absorbing structure to the second support lies in the thickness $e_2$ of the second support. The thickness $e_2$ can be defined by a dimension between two points on the second support taken in a direction parallel to the principal direction along which the force-absorbing structure extends. Advantageously, the distance between an external or internal face of the second support and the centre of the swivel connection coupling the force-absorbing structure to the second support is equal to $e_2/2$.

According to a non-limitative embodiment, at least one support taken from among the first and second supports of the hexapod system comprises a connector configured so as to cooperate with one end of a force-absorbing structure so as to form respectively an embedding and a swivel connection.

Advantageously, the connector is also configured so as to cooperate with an additional force-absorbing structure so as to form: a connection embedded with one from among the force-absorbing structure and the additional force-absorbing structure; a swivel connection with the other one from among the force-absorbing structure and the additional force-absorbing structure. Thus the same connector is common to two articulations.

Advantageously, at least one from among the first and second supports comprises a connector configured so as to cooperate with said force-absorbing structure so as to form together said embedding or respectively said swivel connection, the connector further being configured so as to cooperate with a second force-absorbing structure of a second articulation, the two articulations being mounted in series, so as to form with this second force-absorbing structure a swivel connection or respectively an embedding, the same connector thus cooperating with the force-absorbing structures of two articulations mounted in series.

Advantageously the connector forms a single piece.

Advantageously, the force-absorbing structures of two articulations are secured to the supports by the connectors only.

Advantageously, the support comprising the connector is common to the two articulations mounted in series.

Advantageously, the actuators of two articulations are articulated for rotation on the common support.

Advantageously, the common support forms a single piece.

Advantageously, the force-absorbing structure has a first end at which the force-absorbing structure is embedded on the first support and a second end at which the force-absorbing structure is coupled to the second support by a swivel and in which the first and second ends of the force-absorbing structure are secured. Thus a rigid connection connects the first and second ends. The latter are not articulated.

Advantageously, the force-absorbing structure extends from one support to the other of the same articulation.

Advantageously, the force-absorbing structure extends in a principal direction perpendicular to the plane in which each support extends. The force-absorbing structure extends substantially linearly.

Advantageously, each articulation comprises a single force-absorbing structure.

Advantageously, the first and second ends of each linear actuator are articulated respectively on the first and second supports solely by a swivel connection.

Advantageously, each linear actuator is configured so as to allow only a translation movement. Advantageously, each linear actuator is a jack.

The first and second ends of each linear actuator thus do not allow any relative rotation.

According to one embodiment, the force-absorbing structure comprises a hollow tube carrying a hollow swivel. The connector is hollow at its centre. The system is configured so as to form a passage channel passing through the force-absorbing structure and the first and second supports. The passage channel passes through the centre of the supports. The polyarticulated arm equipped with a plurality of hexapod systems comprises at least one cable or at least one pipe passing through the passage channel of each of the hexapod systems. The passage channels of each of the hexapod systems of the arm form a continuous passage channel.

Preferably each force-absorbing structure comprises at least one hollow tube carrying a hollow swivel, each articulation being configured so as to form a passage channel formed at least partly by the force-absorbing structure, the arm also comprising at least one cable or at least one pipe passing through all the hexapod systems by passing through their passage channels.

According to a non-limitative embodiment, the robot is a robot for dismantling and/or working in a hostile environment.

Figure 2:
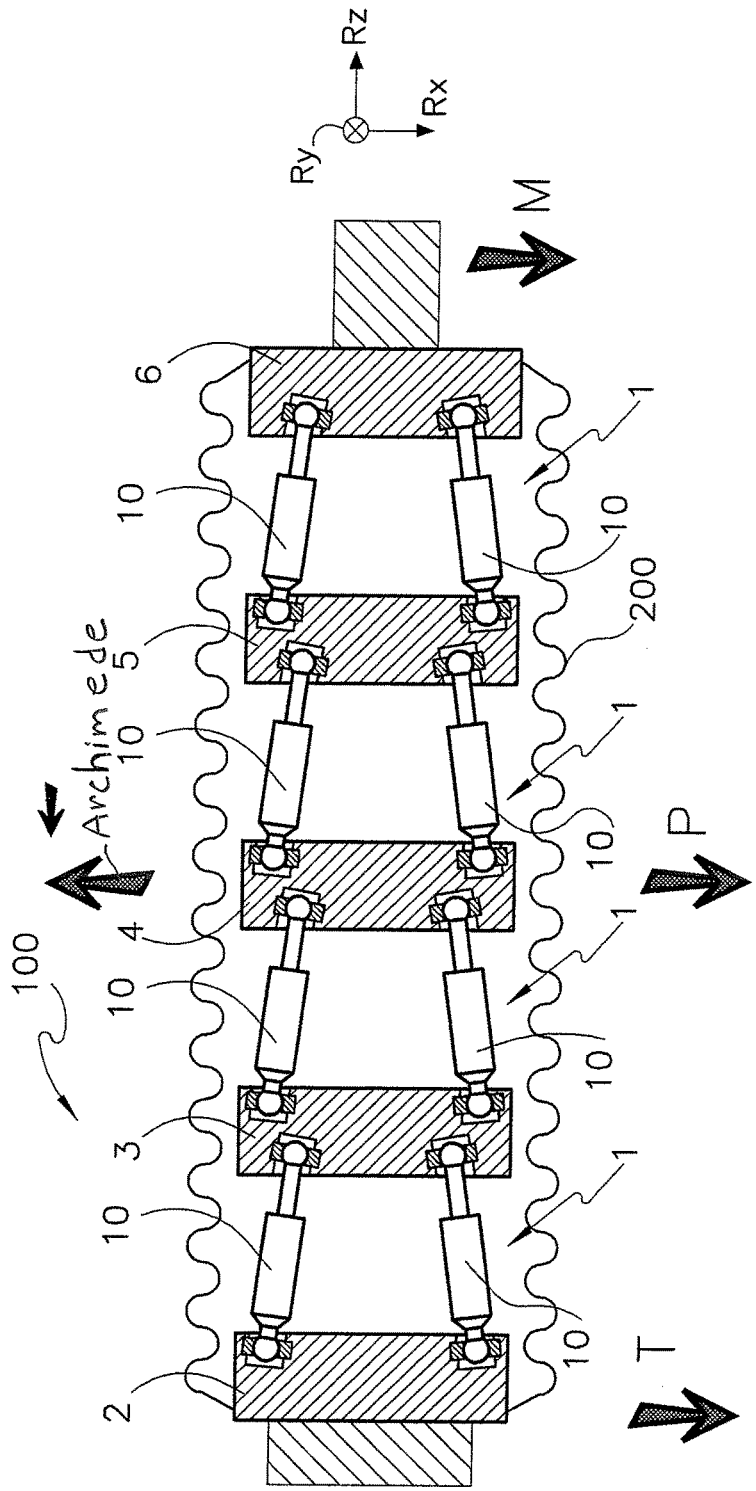
FIG. 2 illustrates, schematically, an example of a polyarticulated arm according to the invention.

FIG. 2 illustrates an embodiment of a polyarticulated arm 100 according to the invention. The arm comprises a plurality of articulations 1 disposed in series. Typically, each articulation 1 comprises a first 2 and second 3 support as well as linear actuators 10, one end of which is coupled by a swivel connection to the first support and the other end by another swivel connection to the second support. The number of linear actuators 10 is one or more.

According to an advantageous but non-limitative embodiment, the articulation 1 comprises six linear actuators 10 and forms a hexapod.

According to the configuration of the linear actuators 10, retracted or deployed, one support of an articulation 1 moves with respect to the other support of this articulation on one or more of its six degrees of freedom. The extension or retraction of each linear actuator 10 thus makes it possible to control precisely and in three dimensions the position and form of the polyarticulated arm 100. In particular, the linear actuators 10 make it possible to move the mass M illustrated in FIG. 2, in rotation about the axes Rx and Ry. The weight of the mass 10 is also shown in this figure. This weight illustrates the load that can be applied to the distal end of the polyarticulated arm 100. Instead of this weight, the arm could exert an identical force on an element external to the polyarticulated arm, for example in the case of an action by the arm aimed at repairing an element external to the arm.

In FIG. 2, the first support referenced 2 is secured to a frame. The supports 3 and 4 are therefore able to move. Advantageously, two juxtaposed articulations share the same support. Thus in the diagram in this FIG. 1, five supports 2, 3, 4, 5, 6 form four articulations.

Particularly advantageously, the polyarticulated arm 100 comprises a sheath 200 that forms a sleeve around the polyarticulated arm 100 or at the very least around the articulations 1.

This sheath 200 is fluidtight. It is deformable and can follow the movements of the articulations. In the case of rotation about an axis Rx or Ry, the sheath 200 follows the shape of the polyarticulated arm 100. It will be remarked that, whatever the curvature of the arm 100, the centres of the radii of curvature of the articulations are situated outside it and usually outside the interior of the sheath 200. The deformation of the sheath is therefore distributed over a relatively large surface thereof. The areas stressed under deformation are therefore extended, which reduces the fatigue of the sheath 200. Its fluidtightness is therefore effective and durable.

The sheath 200 is therefore well suited for changing the position of the arm 100 in an environment where the articulations must be protected. Such is the case with a sodium-coolant reactor for example.

Preferably, the sheath 200 is fixed sealingly at one of its ends to the frame or to the support 2 secured to said frame, that is to say to the support for the proximal end of the arm 100. It is preferably fixed at its other end to the support 6 of the distal end of the arm 100 or to an element secured to this support 6.

Preferably, the sheath 200 has a continuous fluidtightness between its two ends. It may be in a single piece or formed by several parts assembled together sealingly.

Preferably, the sheath 200 has a constant volume or is slightly compressible. Thus it is deformable but not compressible or only slightly compressible under the effect of an external pressure. Subjected to a relatively strong surrounding pressure, typically between 1 and 10 bar, the sheath 200 keeps a substantially constant volume. More generally, subjected to a relatively high surrounding pressure, typically between 1 and 10 bar, the volume of the sheath 200 does not decrease by more than 10% and preferably does not decrease by more than 5%. Such an external pressure may for example be generated by a fluid in which the polyarticulated arm 100 is immersed. This is what may happen when the arm 100 performs an ISIR task in a sodium-coolant reactor.

Figure 8:
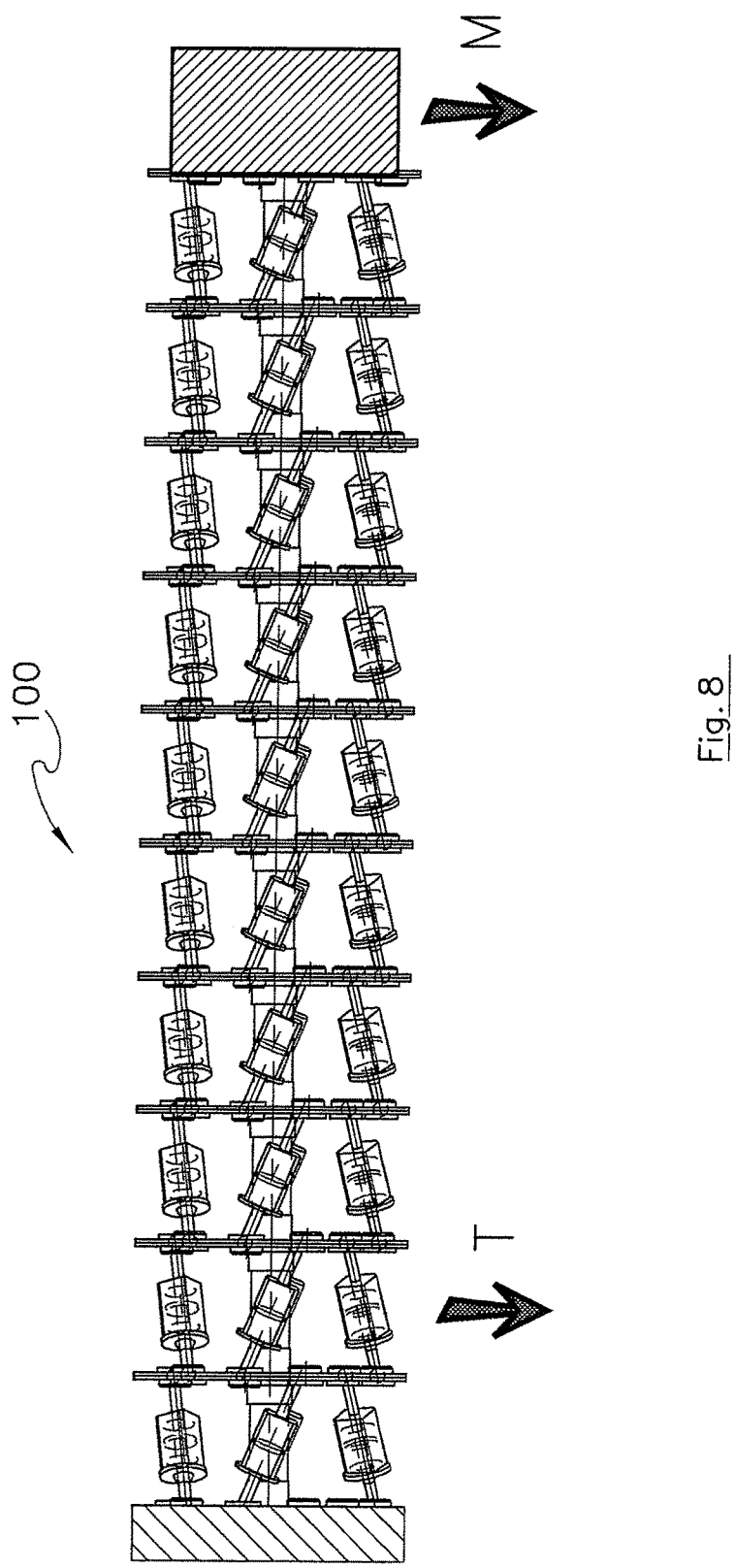
FIG. 8 illustrates schematically the forces that are applied to a polyarticulated arm illustrated in FIG. 7.

The sheath 200 has a constant volume which prevents it from coming into contact with the linear actuators 10 under the effect of an external pressure. The risks of tearing are then avoided. Moreover, the sheath 200 increases the volume of the polyarticulated arm 100 and therefore increases the Archimede buoyancy exerted on the latter. The Archimede buoyancy is illustrated in FIG. 8. This Archimede buoyancy compensates for all or part of the weight of the polyarticulated arm 100. This is because the weight of the arm 100 itself has a tendency to be added to the load of the mass M carried by the distal end of the arm and/or by the force exerted by this end on an external element. The shearing force caused by the weight itself of the arm 100 therefore limits the load capacity of the latter. By virtue of the invention, the load capacity that can be deployed by the arm 100 is thus increased while compensating for all or part of the inherent weight of the arm by means of the Archimede buoyancy.

This is particularly advantageous when the arm 100 has a high mass because of its length, the number of articulations that it comprises or the size of the latter.

This is particularly advantageous when the arm is deployed horizontally and/or works in a deployed position close to horizontal.

The fluid present inside the sheath 200 is lighter than the fluid of the medium surrounding the arm 100. Typically, gas will be favoured, for example air, when the polyarticulated arm 100 moves in a liquid. It will also be possible to provide a gas lighter than air, such as helium, when the arm 100 is moving in free air. This is all the more advantageous since the weight of the arm 100 causes a shearing force on the force-absorbing structure 50 when it not vertical. This weight and the shearing force that it causes are illustrated in FIG. 2.

Preferably, the sheath 200 is formed by a corrugated tube such as a bellows tube. Advantageously, it is formed by a corrugated tube made from metal, for example stainless steel. The choice of such a material makes it possible to withstand the pressure of the surrounding fluid, or even temperature and/or chemical stress when it is a case for example of a sodium coolant. The rigidity of the corrugated tube enables the sheath 200 to keep a volume enabling it to follow the movements imparted by the polyarticulated arm, even in the presence of external pressure.

According to another embodiment, the sheath 200 comprises a flexible fluidtight external envelope and a rigid framework on which the flexible envelope bears. The framework thus forms a support structure. It is for example made from metal. It can be attached to the polyarticulated arm 100.

According to another embodiment, the framework is formed by the supports 2, . . . , 6 of the articulations 1. The latter are therefore sized so as to keep the envelope at a distance from the linear actuators 10 and the swivels coupling the linear actuators to the supports.

According to yet another embodiment, a sheath is provided that is partly deformable but prevents a deformation that would give rise to contact between the sheath and the actuators 10. Thus it would be possible to have a sheath formed by a flexible external envelope that can deform until it encounters a rigid framework preventing it from coming into contact with the linear actuators 10. Thus the risks of tearing the sheath in contact with the linear actuators 10 are eliminated.

According to yet another embodiment, the arm is configured so as to maintain sufficient pressure inside the sheath 200 to maintain the volume of the latter. Thus it is possible to make provision for injecting a pressurised gas into the sheath so that the pressure inside the sheath 200 balances the action of the surrounding pressure on the sheath.

Figure 3:
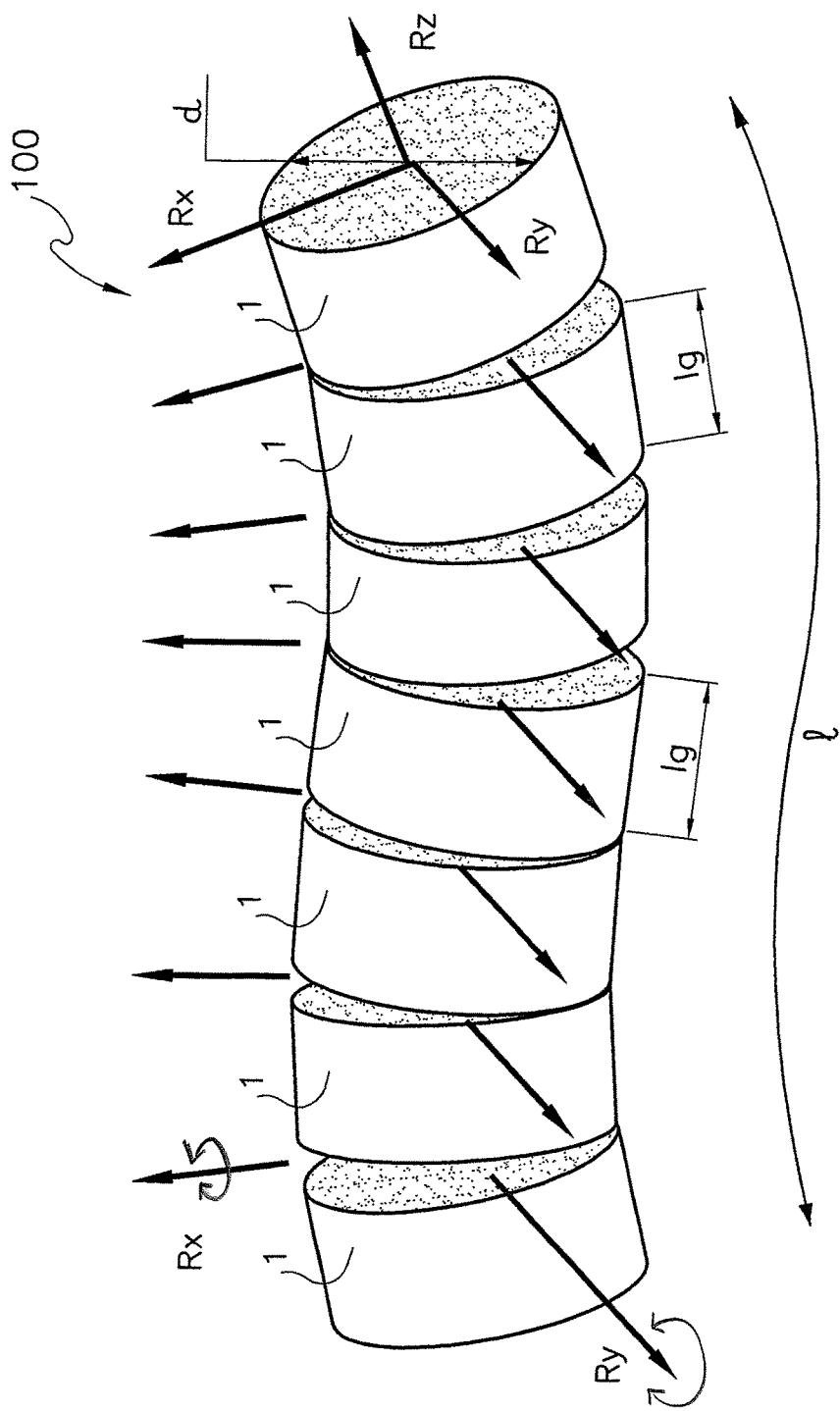
FIG. 3 illustrates, even more schematically, an example of a polyarticulated arm according to the invention.

FIG. 3 illustrates highly schematically the polyarticulated arm 100. In this figure, the polyarticulated arm 100 comprises seven articulations. According to a particular embodiment, each articulation 1 is a hexapod. To confer good dexterity on the arm and to enable Ig to work in areas that are difficult to access, the ratio between length (reference if in FIG. 3) and diameter (reference d in FIG. 3) must be as small as possible while limiting the total weight of the arm and therefore the number of articulations. Preferably a ratio will be chosen such that:

$$0.5 < Ig/d < 1$$

It should be noted that the supports are not necessarily discs or circular in shape, the diameter d then being the maximum transverse diameter of the support.

Figure 4:
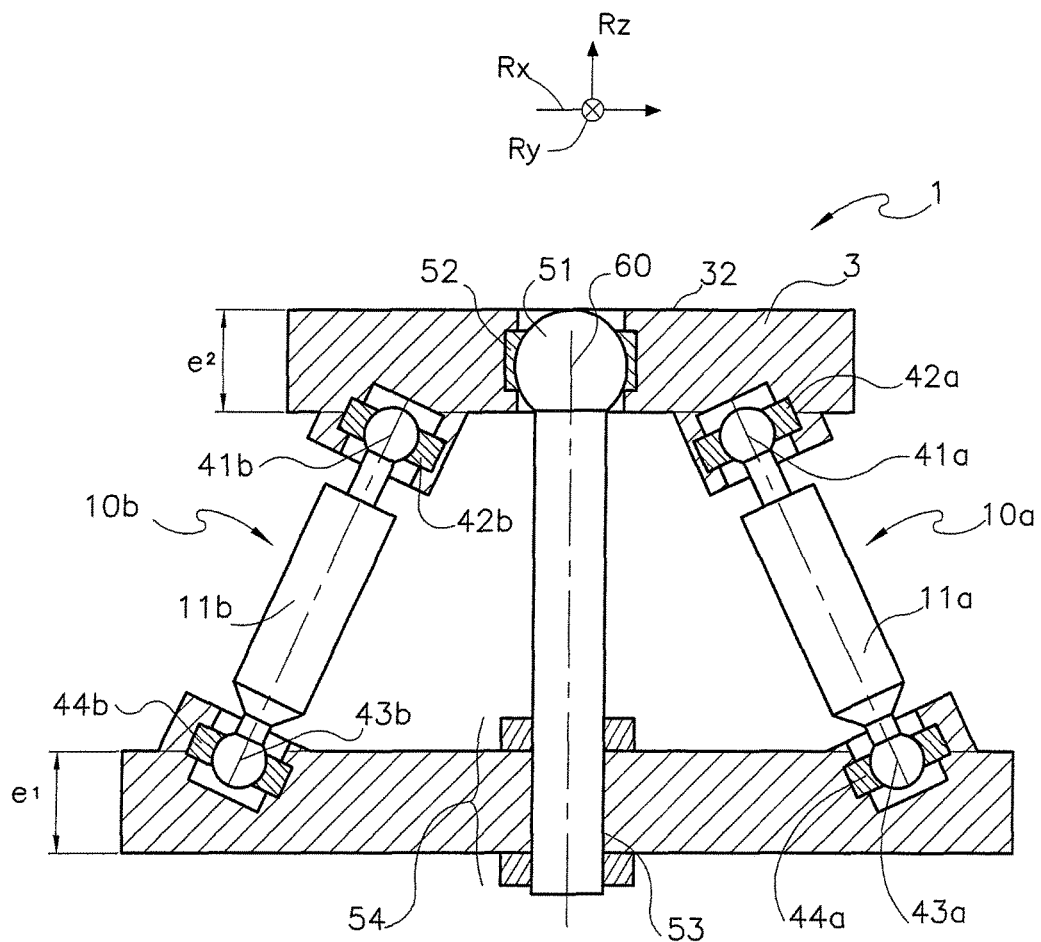
FIG. 4 illustrates, schematically, a non-limitative example of an articulation integrated in a polyarticulated arm according to the invention.
Figure 5:
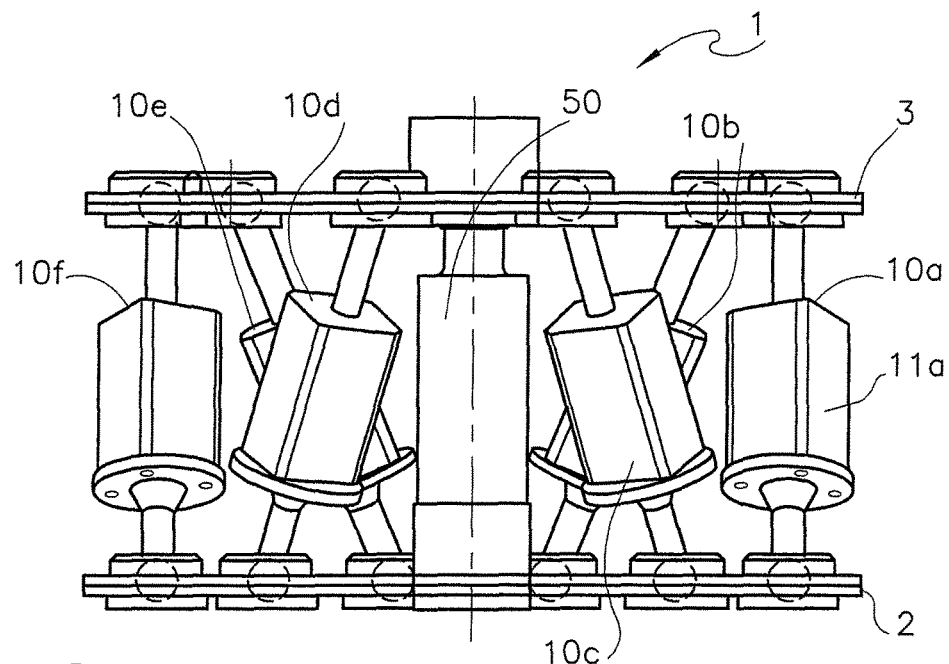
FIG. 5 illustrates a second embodiment of an articulation integrated in a polyarticulated arm according to the invention.
Figure 6:
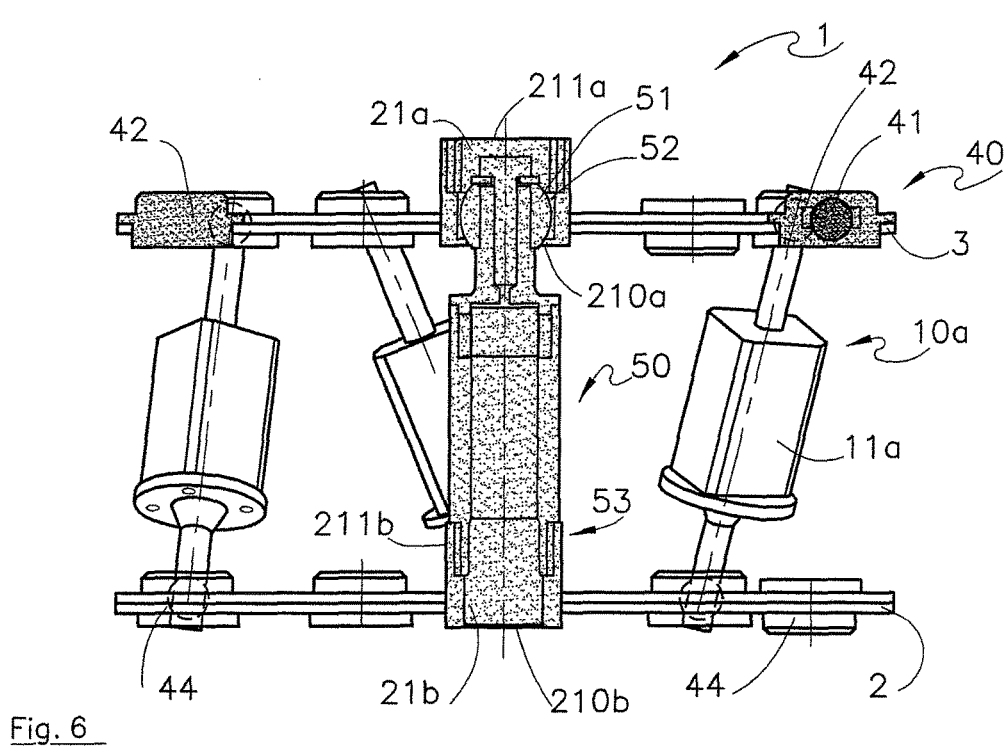
FIG. 6 is a cross section of the articulation according to the embodiment illustrated in FIG. 5.

FIGS. 4, 5 and 6 illustrate particularly advantageous embodiments of articulations that can be disposed in series in order to form a polyarticulated arm 100 according to the invention. This articulation 1 comprises at least three and preferably six linear actuators 10 as mentioned previously. These articulations of the hexapod type are very effective when it is a case of moving masses carried by a top plate in a configuration where the weight exerted by this mass is perpendicular to the plate. On the other hand and as illustrated in FIG. 3, when the arm is not vertical, the weight of each articulation and the weight of a mass fixed to the distal end of the articulation cause a moment and a shearing force. This force very significantly reduces the load capacity of the arm 100. The same applies when the arm must exert a force transverse to the principal direction in which it extends, that is to say the direction Rz.

To remedy this, an advantageous embodiment, one example of which is illustrated in FIG. 4, makes provision for modifying the known systems with three or more linear actuators by integrating a mechanical structure conformed so as to absorb the shearing force T so as to relieve the linear actuators of this shearing force.

This structure for absorbing the shearing force is preferably housed at the centre of the hexapod. It is secured to the fixed support and swivel connection with the support to be moved with respect to the movable support. This articulation forms a swivel offering two degrees of rotational freedom on the required axes, that is to say on the axes Rx and Ry.

Example embodiments of this articulation will now be described in more detail respectively with reference to FIG. 4 and FIGS. 5 and 6.

FIG. 4 illustrates a first example of an articulation 1, typically a hexapod, comprising a first support 2 and a second support 3. The invention is not limited to any particular form of support; non-limitatively, each support may have a planar form and constitute a plate.

Also non-limitatively, it will be considered in this description that the second support 3 must be rotated with respect to the first support 2. For this purpose, six linear actuators 10a, 10b, . . . 10f are each articulated by one of their ends on the first support 2 by a swivel connection 43a, 44a, . . . , 43f, 44f and articulated by one of their other ends on the second support 3 by means of another swivel connection 41a, 42a, . . . , 41f, 42f. Each swivel connection 41a, . . . , 41f, 43a, . . . , 43f cooperates with a seat 42a, . . . , 42f, 44a, . . . , 44f carried by one of the two supports 2, 3.

These linear actuators 10a, . . . , 10f, also referred to as articulation arms, comprise for example hydraulic, pneumatic or screw jacks for example. These linear actuators 10a, . . . , 10f are disposed in pairs so for example that the swivel connection of the actuator 10b is disposed on the first support 2 closer to the actuator 10a than the other actuators 10c, . . . , 10f and so that this actuator 10b is disposed on the second support 3 closer to the actuator 10c than the other linear actuators 10d, ..., 10a. Thus this arrangement of the actuators avoids rubbing or jamming points on the mechanism.

The system also comprises a force-absorbing structure 50. This structure is embedded in the first support 2. It is coupled to the second support 3 by a swivel connection 51, 52. This force-absorbing structure 50 is rigid, that is to say it is conformed so as to transmit forces (along Rx, Ry and Rz) between the embedding 54 and the swivel connection 51, 52. Preferably, it does not comprise any articulation other than the swivel connection 51, 52.

According to an advantageous embodiment illustrated, this structure forms a connecting arm. One end 53 of the connecting arm cooperates with the first support 2 in order to form the embedding 54. The other end of the connecting arm forms a swivel 51 that cooperates with a seat 52 secured to the second support 3 in order to form a swivel connection 51, 52. Advantageously, the connecting arm forms a tube.

The second support 3 has at least two degrees of freedom in rotation about axes Rx and Ry illustrated in FIG. 4, the rotation axis Rz being the natural rotation axis of the second support 4. In the case where the force-absorbing structure is substantially linear, cylindrical or conical in its principal direction, the axis Rz is parallel to the principal direction along which this structure lies.

In a particular embodiment, the second support 3 can also turn with respect to the first support 2 on the axis Rz perpendicular to the axes Rx and Ry. This rotational freedom on the axis Rz can for example serve to screw an element by means of a tool carried by the support.

Preferably, when a sheath 200 equips the arm 100, rotation on the axis Rz will be prevented in order to avoid risks of tearing of the sheath 200. This elimination of the rotation on the axis Rz is for example obtained by controlling the linear actuators 10.

Particularly advantageously, the centre 60 of the swivel connection 51, 52 is situated in the thickness of the second support 3. The thickness of the first support is referenced $e_2$ in FIG. 4. For example, in the case of a second support 3 forming a plate having a bottom face 31 and a top face 32, the centre 60 is situated between these two faces 31, 32. In other words, the centre of rotation 60 of the swivel connection 51, 52 is situated between two planes parallel to each other, parallel to the plane defined by the axes Rx and Ry, and passing through the second support 3.

Particularly advantageously, the centres of the swivels 41a, ..., 41f, 43a, ..., 43f are situated respectively in the thickness $e_2$ of the plate 3 and $e_1$ of the plate 2. The centres of the swivels 41a, ..., 41f are coplanar and the centre 60 belongs to the plane containing the centres of the swivels 41a, ..., 41f. This helps to reduce the forces exerted by the actuators 11a, ..., 11f other than those necessary for moving the plate 3. The centres 43a, ..., 43f are also coplanar.

Thus the invention eliminates or at the very least reduces the lever arm between the centre of rotation 60, the second support 3 and the centres of the swivels 41a, ..., 41f, thereby limiting the shearing forces that have to be balanced by the actuators 11a, ..., 11f to the detriment of the forces necessary for moving and the movements generated on the second support 3. The force-absorbing structure 50 in particular absorbs the shearing force that would be exerted by an external force oriented non-perpendicularly to the first support 2 and exerted on the support 3. That is to say a force exerted non-perpendicularly to the plane defined by the axes Rx and Ry.

The size and weight of the system can then be reduced while keeping its load capacity in rotation on the axes Rx and Ry.

Preferably, the swivel connections 41, 42 of the linear actuators 10 with the second support 3 form a flat contour. The centre 60 of the swivel connection 51, 52 of the shearing-force absorbing structure 50 is situated so that a straight line perpendicular to said plane and passing through the centre 60 also passes inside said contour. Preferably, the centres of the swivels 41, 42 define a circle and the centre 60 situated at the middle of the circle or on a straight line perpendicular to the circle and passing through the centre of the circle. Thus the forces of the second support 3 are distributed evenly over the force-absorbing structure 50.

Preferably, the same applies to the embedded connection 54. It is preferably situated inside a circumference defined by the centre of the swivel connections 43, 44. Preferably, this circumference forms a circle and the embedding 54 is situated at the middle of this circle or on a straight line perpendicular to this circle and passing through its centre.

The embodiment illustrated in FIGS. 5 and 6 repeats the features of the embodiment described above with reference to FIG. 4. In addition, in this embodiment, the centre of rotation 41 of the swivels articulating the linear actuators 10 on the second support 3 is moved closer to this second support 3. Preferably, the centre of rotation 41 is situated in the plane or in the thickness $e_2$ of the second support 3. This further reduces the lever arm between the swivel and the second support 3, thereby reducing the forces applied to this support 3 and to the linear actuators 10. The embedding and the weight of the system can then be reduced while preserving the rotation capacity on the axes Rx and Ry.

Likewise, and preferably, the centre of rotation 43 of the swivels articulating the linear actuators 10 on the first support 2 is moved closer to this first support 2. Preferably, the centre of rotation 43 is situated in the plane or in the thickness $e_1$ of the first support 3.

Preferably, each support 2, 3 is a metal plate, the thickness of which is relatively small compared with the height of the system, the height of the system being taken in the direction Rz. These metal plates may be provided with reinforcements increasing their rigidity along the axes Rx and Ry in order to limit their deformation under the action of the forces generated by the actuators, the force-absorbing structure and the external forces.

Preferably, the first and second supports 2, 3 are plates on which the seats 42, 44 of the swivel connections are attached in order to articulate the linear actuators 10. Manufacture of the system is thus facilitated thereby.

Preferably, the second support 3 comprises a connector 21a. This connector 21a comprises the seat 52 of the swivel connection 51, 52 articulating the force-absorbing structure 50 on the second support 3. Preferably, this connector 21a is also conformed so as to accept the end of another force-absorbing structure 50 in order to form with the latter an embedding. Thus the same connector can serve to form a swivel connection and to form an embedding. Thus the first and second supports 2, 3 may be similar, which facilitates the manufacture and cost thereof.

Advantageously, the first support 2 also comprises a connector 21b. Thus, before the system is assembled, the first and second supports 2, 3 are identical.

According to a particular embodiment, the connectors 21a, 21b are in the form of a sleeve having two ends. A first end 210a, 210b is configured so as to accept the seat 52 and the swivel 51 forming the swivel connection 51, 52 of the shearing-force absorbing structure 50. A second end 211a,

221b is configured so as to accept the end 53 of the structure 50 so as to form with the latter an embedding. Typically, this embedding connection 54 is obtained by screwing the shearing-force absorbing structure 50 in the connector 21a, 21b. A pin can for example be provided to eliminate the remaining degree of freedom in rotation.

Advantageously, the same connector is configured so as to receive simultaneously a first structure 50 for forming a swivel connection and a second structure 50 for forming an embedding connection.

Thus the same connector 21 and the same support can be used for two hexapods mounted in series.

Figure 7:
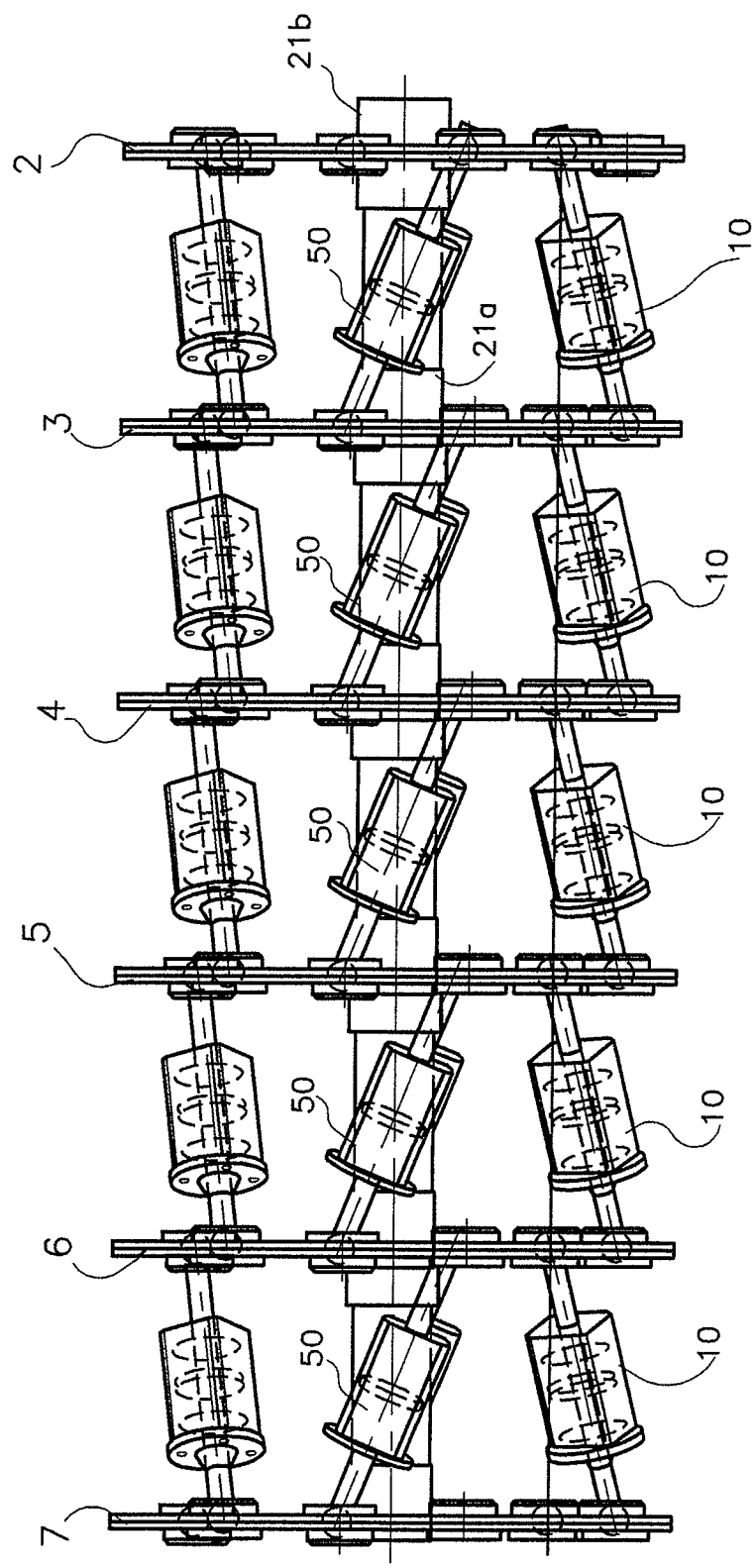
FIG. 7 illustrates a polyarticulated arm comprising a plurality of articulations according to the embodiment illustrated in FIG. 6 and which are mounted in series.

FIG. 7 illustrates clearly this advantage of the invention. In this figure, the second support 3 supports a connector 21a that cooperates on one hand with a force-absorbing structure 50 coupled to the support 2 and on another hand with another force-support structure 50 coupled to the support 4. This particular arrangement of the poly-articulated arm 100 has reduced mass and facilitated assembly.

FIG. 8 illustrates the poly-articulated arm 100 of FIG. 7 in a working configuration in which the weight of the mass M supported by the distal end of the arm 100 is transverse to the principal direction Rz along which the arm 100 extends. The weight and the shearing force generated are shown in this figure.

The force-absorbing structures 50 fully fulfil their role and absorb the shearing force generated by the weight of the mass M and by the inherent weight P of the poly-articulated arm 100. The load capacity of the linear actuators 10 is then preserved and can be entirely dedicated to generating the movement of the arm to rotate the mass M in the directions Rx and Ry or to exert actions on elements external to the arm 100 in these same rotations.

Figure 9:
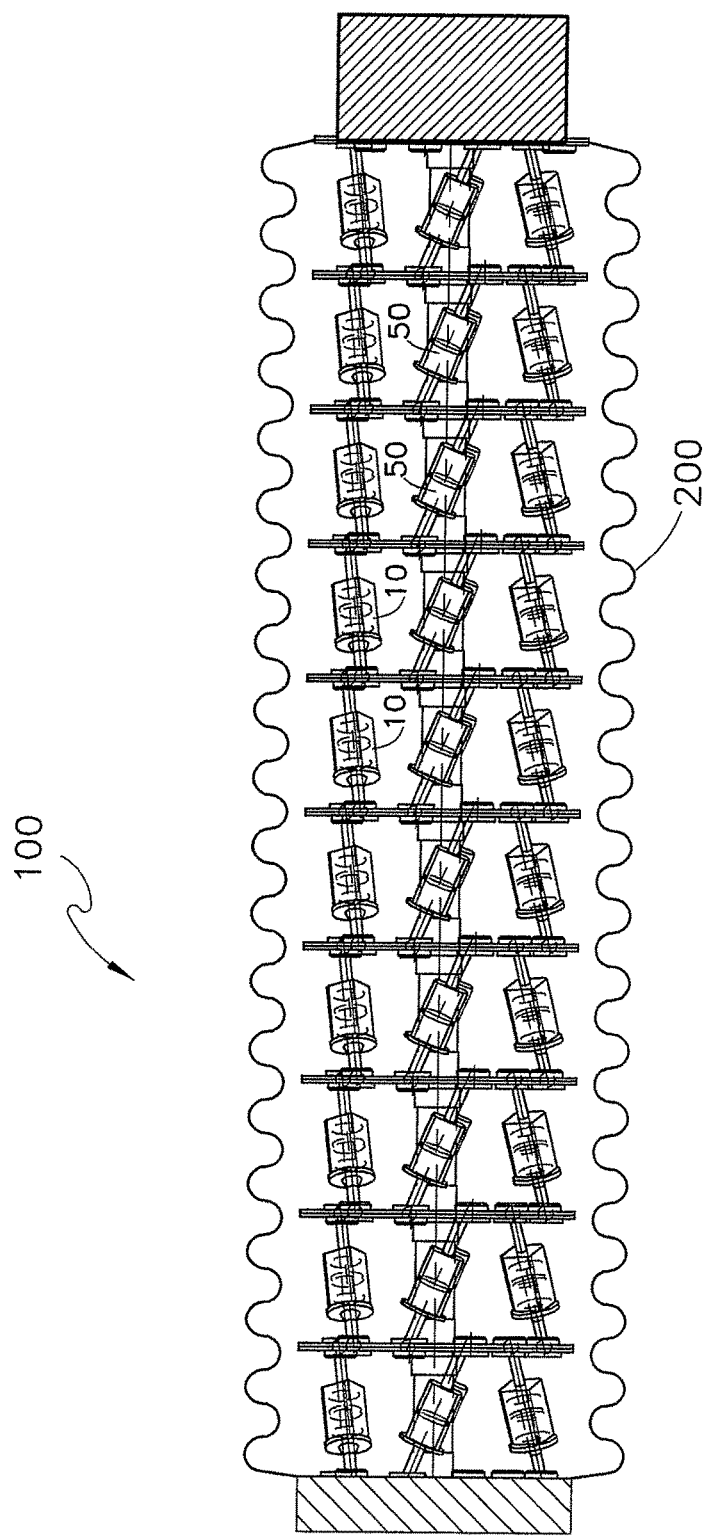
FIG. 9 illustrates schematically an example of a polyarticulated arm according to the invention including articulations as illustrated in FIGS. 5 and 6, as well as a sealing sheath.

FIG. 9 illustrates an embodiment in which the articulations 1 each comprise a structure 50 for absorbing shearing force and in which the articulations are enveloped in a sheath 200.

To produce a poly-articulated arm for ISIR operations in a sodium cooled reactor, it is possible for example to adopt the following features:
  number of articulations: between 10 and 30;
  total length of the poly-articulated arm: between 2 and 15 meters;
  maximum dimension/diameter of the supports in a transverse direction: between 300 and 800 millimeters and preferably 600 mm;
  length of an articulation in deployed configuration of the mechanical actuators: between 300 and 800 millimeters and preferably 600 mm;
  sheath formed by a stainless steel corrugated tube;
  force that can be developed by each linear actuator in its working direction: between 0 and 100 kN.

Figure 10:
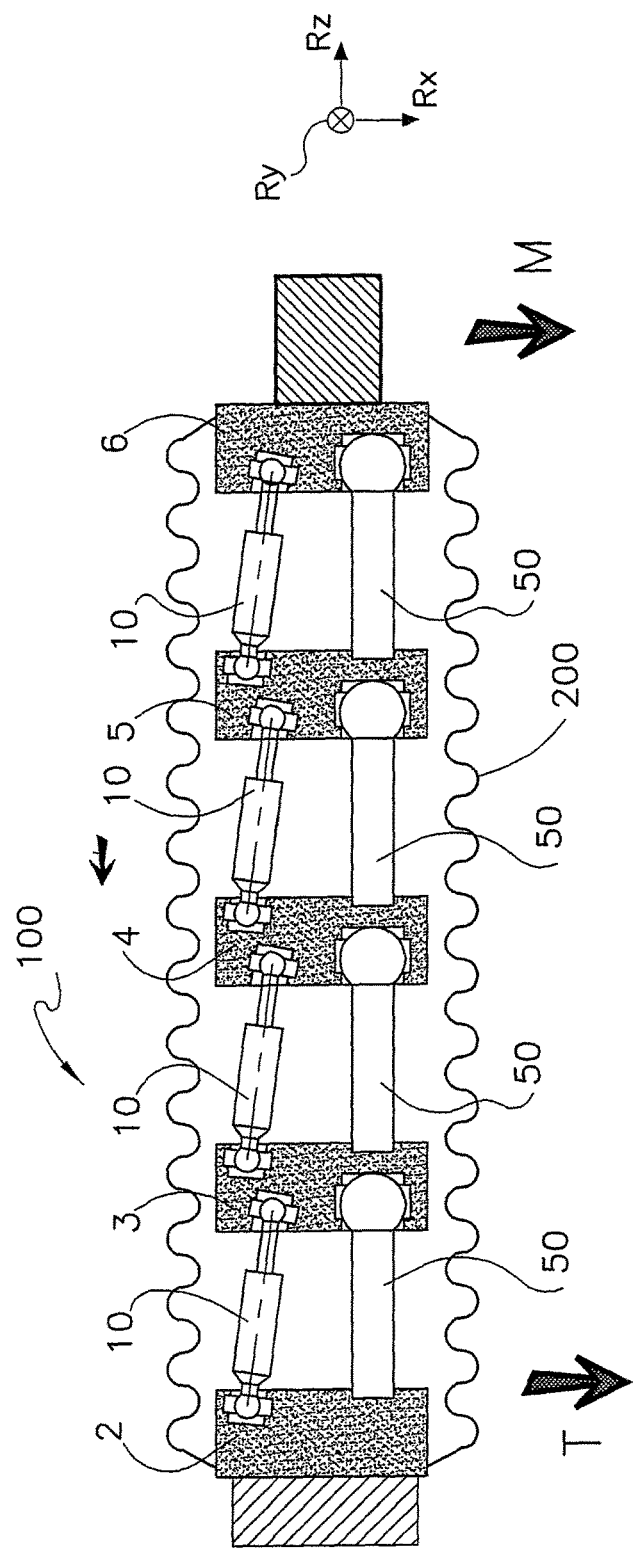
FIG. 10 illustrates schematically another embodiment of the invention in which each articulation comprises a single linear actuator.

FIG. 10 illustrates a particular embodiment in which an articulation 1 comprises only one linear actuator 10. In this embodiment, the force-absorbing structure 50 is particularly advantageous since the number of linear actuators 10 is limited to one only, and the shearing forces would then have to be absorbed by this single linear actuator, which would limit the load capacity of the poly-articulated arm 100. A particular embodiment is fitting a finger-tight swivel to lock the rotation movement about Rz since such a movement is incompatible with a bellows movement. On the other hand, if this rotation movement is not blocked, it can be envisaged being able to screw.

FIG. 11 illustrates an optional but particularly advantageous embodiment. In this embodiment, the force-absorbing structure 50 is entirely hollow. Each hexapod system 1 thus has a passage channel 61. This lightens the whole of the articulation 1 and therefore lightens the polyarticulated arm or allows an increased load capacity for an equivalent weight. This also makes it possible to pass cables or pipes at the centre of the connection. Rotation of the articulation about the axis Rz, that is to say about the axis along which the force-absorbing structure mainly extends, thus does not cause twisting of the cables or pipes passing through it, even if these cables or pipes extend from one end to the other of the polyarticulated arm. Moreover, positioning the cables at the centre of the articulation avoids elongating them during movements of the articulation. These cables are for example electric cables, making it possible for example to control tools disposed on the arm or making it possible to communicate with sensors supported by the arm. Pipes can make it possible to control and actuate tools, for example pneumatic or hydraulic, disposed on the arm. These pipes can also make it possible to inject, take off or extract a fluid from the end of the arm.

According to the non-limitative embodiment illustrated in FIG. 11, the force-absorbing structure 50 is substantially similar to the one described with reference to FIGS. 5 and 6.

The connector 21a is hollow. It comprises a through internal bore.

The second end 211a of the connector comprises an internal thread 59 cooperating with an external thread situated on the external face of a first end 53 of the hollow tube 55 of the force-absorbing structure.

The first end 210a of the connector comprises a reduction in cross-section that prevents the swivel 51 from emerging from the bore formed by the connector.

The hollow tube 55 comprises a second end carrying on its internal face a thread 57 conformed so as to cooperate with a complementary thread carried by an external face of a part forming a swivel support 56 for the swivel 51. This swivel support 56 is thus fixed to the hollow tube 55 by screwing. This embodiment considerably simplifies the manufacture and assembly of the articulations.

The swivel support 56 comprises a portion for receiving the swivel 51. The swivel 51 forms mainly a sphere that comprises a bore complementary to this reception portion and is fitted on the latter from the end of this swivel support 56. A retention stop is also provided to prevent withdrawal of the swivel 51. This stop preferably comprises a screw having an external thread that cooperates with an internal thread carried by the bore of the support 56 for the swivel 51. Thus the screw is fixed to the end of the support 56 of the swivel 51. The screw head has a cross-section larger than the bore of the swivel 51. The latter thus abuts against the bottom face of the screw head. Preferably, a washer is provided between the screw head 58 and the swivel 51.

Particularly advantageously, the screw is hollow. The force-absorbing structure 50 comprising the two connectors 21a, 21b, the hollow tube 55, the support 56 for the swivel 51, the swivel 51 and the screw 58 therefore has a through opening forming a passage channel 61 for a cable or a pipe.

Advantageously, an articulation 1 is assembled as follows:
  fixing, preferably by screwing, the hollow tube 55 to the connector 21b secured to the support 2;
  fixing, preferably by screwing, the support 56 for the swivel 51 on the hollow tube 55;
  passing the support 56 for the swivel 51 through the connector 21a secured to the support 3;

positioning the swivel 51 on the reception portion carried by the swivel support 56 and inside the seat 52 formed by the connector 21a;

fixing, preferably by screwing, the retention stop, here the hollow screw 58 and the washer on the support 56 for the swivel 51.

The assembly of the arm can then continue with the assembly of a second articulation. For this purpose, the above steps are reiterated using the connector 21a of the support 3. The first step thus consists of fixing another hollow tube on the connector 21a.

Other embodiments can be envisaged for forming a channel passing through each of the articulations.

It is thus clear that the invention offers a robust solution for simply absorbing the shearing force in order to relieve the actuators. The invention also proposes an effective solution of the mechanised swivel type for moving a load or for exercising an action according to at least two degrees of freedom in rotation.

The invention thus proves to be particularly effective for forming a polyarticulated arm used in inspection or repair tasks in a constraining environment such as in nuclear reactors.

The invention is not limited to the embodiments described above and extends to all embodiments covered by the claims.

In particular, although it is particularly advantageous for inspection and repair tasks in a nuclear environment, the invention also applies to articulations from robots having other tasks or being intended to move in other environments.

The invention claimed is:

1. An articulated arm comprising at least three articulations mounted in series in order to allow movements of the arm on at least two rotation axes (Rx, Ry) by articulation, each articulation comprises a first and a second support and at least three linear actuators, each linear actuator having a first and second end articulated respectively on the first and second supports by a swivel connection, the arm comprising a deformable fluidtight sheath enveloping the articulations and conformed so as to follow the movement of the articulated arm and to be maintained at a distance from the linear actuators and swivel connections whatever the movement of the articulated arm, wherein at least one articulation comprises a force-absorbing structure that is on one hand embedded on the first support and on another hand coupled to the second support by a swivel;

wherein the force-absorbing structure is embedded on the first support at the centre of a circle formed by the swivel connections which articulate the linear actuators on the first support;

wherein the centre of rotation of the swivel formed by the second support and the force-absorbing structure is situated at the centre of a circle formed by the swivel connections which articulate the linear actuators on the second support or is situated on a straight line perpendicular to said circle and passing through the centre of said circle, and wherein at least one of the articulations comprises six linear actuators so as to form a hexapod articulation.

2. The articulated arm according to claim 1, wherein the swivel connections which articulate the linear actuators on the first support each have a centre of rotation that is situated in a thickness of the first support and the swivel connections which articulate the linear actuators on the second support have a centre of rotation that is situated in a thickness of the second support.

3. The articulated arm according to claim 1, wherein a volume of the sheath remains constant or does not vary by more than 10% when the articulated arm is subjected to a pressure less than or equal to 10 bar.

4. The articulated arm according to claim 1, wherein the sheath is a corrugated tube.

5. The articulated arm according to claim 1, wherein the first and second supports are conformed so as to maintain the sheath at a distance from the linear actuators.

6. The articulated arm according to claim 1, further comprising a support structure configured to maintain the sheath at a distance from the linear actuators.

7. The articulated arm according to claim 1, configured so as to ensure a pressure suitable for maintaining the sheath at a distance from the linear actuators inside the sheath.

8. The articulated arm according to claim 1, wherein the sheath is composed of a succession of sheath portions connected sealingly to one another.

9. The articulated arm according to claim 1, wherein the sheath comprises a fluidtight envelope supported by a support structure.

10. The articulated arm according to claim 1, wherein the sheath is in a single piece.

11. The articulated arm according to claim 1, wherein the sheath is made from metal.

12. The articulated arm according to claim 1, wherein each articulation has a length and width such that a ratio of length to width is between 0.5 and 1, the length being taken in a longitudinal direction of the arm and the width being taken in a transversal direction to the longitudinal direction.

13. The articulated arm according to claim 1, wherein the arm comprises at least eight articulations.

14. The articulated arm according to claim 1, wherein a centre of rotation of the swivel coupling the force-absorbing structure to the second support is situated in a thickness of the second support.

15. The articulated arm according to claim 14, wherein the centre of rotation of the swivel coupling the force-absorbing structure to the second support is situated between two planes passing through the second support, said two planes being parallel to each other and perpendicular to an axis (Rz) that passes on one hand through an embedding connection between the force-absorbing structure and the first support and on another hand passes through a centre of the swivel coupling the force-absorbing structure to the second support.

16. The articulated arm according to claim 1, wherein two articulations in series comprise a common support.

17. The articulated arm according to claim 1, wherein at least one support taken from the first and second supports of the hexapod system comprises a connector configured so as to cooperate with a force-absorbing structure so as to form an embedding and a swivel.

18. The articulated arm according to claim 17, wherein the connector is further configured so as to cooperate with a second force-absorbing structure of a second articulation, the two articulations being mounted in series, so as to form with this second force-absorbing structure a swivel connection and respectively an embedding, the same connector thus cooperating with the force-absorbing structure of two articulations mounted in series.

19. The articulated arm according to claim 18, wherein the connector forms a single piece.

20. The articulated arm according to claim 18, wherein the force-absorbing structure of the two articulations mounted in series are secured to the supports solely by the connectors.

21. The articulated arm according to claim 18, wherein the support comprising the connector is common to the two articulations mounted in series and wherein the actuators of the two articulations are rotationally articulated on the common support.

22. The articulated arm according to claim 18, wherein the common support forms a single piece and all the articulations comprise a force-absorbing structure.

23. The articulated arm according to claim 1, wherein the force-absorbing structure has a first end at which the force-absorbing structure is embedded on the first support and a second end at which the force-absorbing structure is coupled to the second support by a swivel where the first and second ends of the force-absorbing structure are secured.

24. The articulated arm according to claim 1, wherein each articulation comprises a single force-absorbing structure.

25. The articulated arm according to claim 1, wherein each force-absorbing structure comprises at least one hollow tube carrying a hollow swivel, each articulation being configured so as to arrange a passage channel partly formed at least by the force-absorbing structure, the articulated arm also comprising at least one cable or at least one pipe passing through all the hexapod systems by passing through a respective passage channel.

* * * * *